J. F. McELROY.
STEAM HEAT REGULATOR.
APPLICATION FILED OCT. 30, 1907.
949,286.
Patented Feb. 15, 1910.
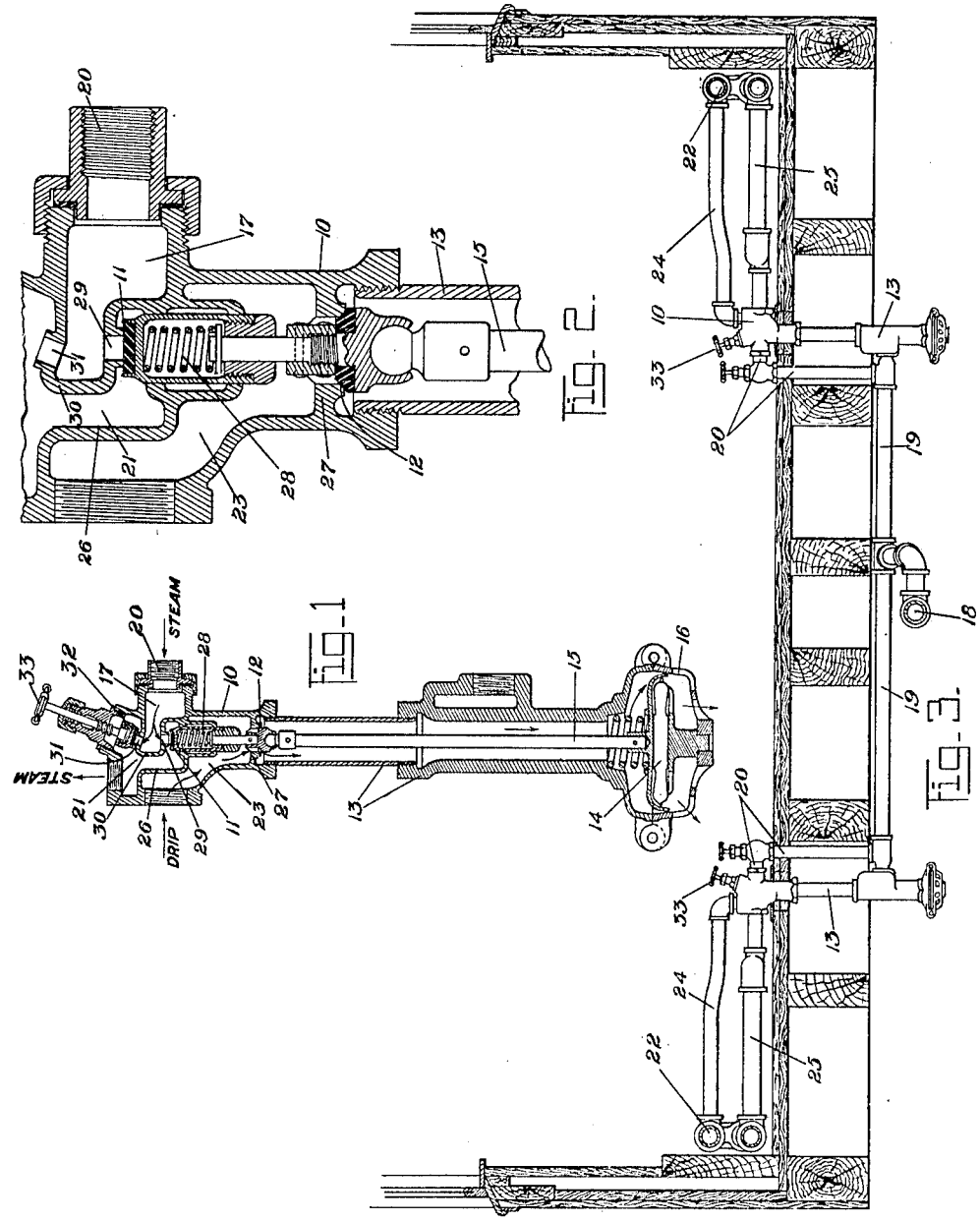

UNITED STATES PATENT OFFICE.

JAMES F. McELROY, OF ALBANY, NEW YORK, ASSIGNOR TO CONSOLIDATED CAR-HEATING COMPANY, OF ALBANY, NEW YORK, A CORPORATION OF WEST VIRGINIA.

STEAM-HEAT REGULATOR.

949,286.  Specification of Letters Patent.  Patented Feb. 15, 1910.

Application filed October 30, 1907. Serial No. 399,870.

*To all whom it may concern:*

Be it known that I, JAMES F. MCELROY, a citizen of the United States, residing at Albany, in the county of Albany and State of New York, have invented certain new and useful Improvements in Steam-Heat Regulators, of which the following is a specification.

This invention relates to the thermostatic regulation of steam in a radiating system such as a car-heating system employing a thermostatically-controlled admission-valve, and it aims to provide improved means for quickly heating up the radiator pipes when cold and for changing from a high-pressure system to a low-pressure system and vice versa, such means involving a novel combination of automatic inlet and discharge-valves with a valve-controlled by-pass around the inlet-valve.

My invention further aims to provide an improved structure including the combination of a valve-casing with by-pass and thermostatic inlet-valves.

Of the accompanying drawings, Figure 1 represents a vertical sectional view of a steam-regulator constructed in accordance with my invention. Fig. 2 represents an enlarged section at right-angles through the valves and casing. Fig. 3 is a cross-section showing the manner of application to a car-heating system.

In the drawings, 10 is a valve-casing in which are mounted the supply-valve 11 for the radiator and the discharge-valve 12 therefor, and 13 is a depending casing forming the drip-conduit and carrying at its lower end the expansible thermostatic device 14 which connects by a rod 15 with the valves. The thermostat-casing 16 is shown as open in its lower portion so that the thermostat is exposed both to the temperature of the discharge and the temperature of the outside air and the heating in the car is thus regulated according to the temperature of the atmosphere outside.

The valve-casing 10 contains a chamber 17, which I call the initial-inlet chamber, connected with the steam-supply piping 18, 19, 20 under the car, a second chamber 21, which I call the radiator-inlet chamber, connected with the inlet-end of the radiator 22, and a third chamber 23, which I term the radiator-outlet chamber, connected with the outlet-end of the radiator. The inlet and outlet branch pipes of the radiator which connect with the chambers 21 and 23 are numbered 24 and 25 respectively in Fig. 3. Chambers 21 and 23 are separated by a partition 26 in which the body of supply-valve 11 has a guide-bearing, and the chamber 23 is separated from the drip-casing 13 by a partition 27 having a discharge-port controlled by the valve 12. The supply or inlet valve 11 closes by the expansion of the thermostat slightly before the discharge or outlet valve 12, and a spring 28 interposed between the valves and contained in the body of valve 11 enables the valve 12 to close after the valve 11 has reached its seat. This spring connection for the valves is made the subject of a separate application, Serial No. 311,227, and I do not herein separately claim this, but it is to be observed that the use of a by-pass in combination with thermostatically controlled inlet and discharge valves, the former of which closes before the latter, affords certain advantages which will be hereinafter described.

Supply-valve 11 controls a port 29 in a partition 30 which separates the initial steam-supply-chamber 17 from the radiator inlet-chamber 21, and the motions of the supply-valve 11 toward and from its seat at the lower end of this port furnish the automatic control of steam to the radiator in accordance with the demand, as determined by the rate of heat dissipation in the car and the temperature of the air outside of the car. The introduction of this latter feature of the control, namely by the outside temperature, is desirable but not indispensable in connection with my present improvement.

The invention is embodied in a simple preferred form as illustrated herewith, by making a second port 31 in the partition 30 for connecting the chambers 17 and 21 directly and independent of the thermostat-valve 11 and controlling said port by means of a by-pass valve 32 with a screw-stem on which is a hand-valve 33 outside of the valve-casing for manually adjusting the by-pass. By this means it becomes possible to admit steam from the train line directly into the radiating-pipes for the purpose of more quickly heating up the system when cold, including the heating of the thermostat so as to quickly render it operative for the performance of its normal functions, and melting any accumulations of ice or snow around the thermostat, or for the purpose of raising the temperature of the radiators in particularly cold weather. The operation then becomes that of an ordinary high-pressure system whose discharge is controlled by a steam-trap in the regular manner, but at any time desired, as when the pipes have become heated up or the enhanced temperature due to a higher steam pressure is no longer needed, the by-pass valve 32 may be closed and the system will then operate on the low-pressure plan without any further adjustment, control being exercised by the thermostatic supply-valve 11 in the manner already described.

The manipulation of the by-pass valve does not change the relation of the thermostat to the automatic inlet and discharge valves or either of them, and they continue to operate for the control of their respective ports, but the opening of the by-pass annuls the effect of the thermostatic inlet control unless the by-pass valve be only partially or slightly opened, in which adjustment it may of course be left as long as desired, giving an increased steam pressure and temperature in the radiator under partial automatic inlet control, and under full automatic outlet control when an outlet valve is present as shown.

The employment of the by-pass in combination with thermostatic inlet and discharge valves, the former of which closes before the latter, especially when these valves are connected by a spring as shown, gives two standard temperatures at which the regulator will operate. The first temperature is that attained when the by-pass valve 32 is closed, by the water of condensation acting on the thermostat to close the admission valve and shut off the supply of steam to the radiator. The second standard temperature is a higher one attained when the by-pass valve is open or partially open and is a temperature which will cause the thermostat to expand sufficiently to compress the spring 28 and allow the discharge valve to close.

It will be evident that some modifications come within the scope of my invention. For example, while it is preferable in most respects to control both the supply and discharge valves by the same thermostatic device, this is not broadly essential to the operativeness of my improvement. Further, the specific location of by-pass valve 32 in the same casing with the automatic valve or valves, while preferred, is not broadly essential although useful and compact, it being noted that the partition 30 is a salient loop in the radiator-inlet chamber 21 and has the automatically controlled port 29 and the by-pass port 31 in opposite walls of the loop, each valve-seat being readily accessible when the regulator is dismembered and each valve having a direct connection with its operating device.

I claim,—

1. A steam heating system comprising a radiator, thermostatic valve-mechanism subject to the discharge from said radiator for controlling both the supply of steam to the radiator and the discharge therefrom, and means independent of the thermostatic inlet-valve mechanism for controlling the supply of steam to the radiator, whereby the system may operate on either the high-pressure or the low-pressure plan.

2. A steam-regulator comprising inlet and outlet valves adapted to regulate the steam supply to and discharge from a heater, a thermostat subject to the discharge fluid and operatively connected with said valves, a by-pass for establishing a direct steam supply to the heater, and an independently adjustable valve controlling said by-pass.

3. A steam-regulator comprising a valve-casing having initial-supply, radiator-inlet, and radiator-outlet chambers, the latter having an exit opening, said casing including a partition which separates the initial-supply and the radiator-inlet chambers and is formed with two ports, a by-pass valve controlling one of said ports and adjustable from the outside of the casing, an automatic inlet-valve controlling the other port, an automatic discharge-valve controlling the exit from the outlet-chamber, and a thermostat subject to the discharge fluid and operatively connected with said automatic valves.

4. A steam-regulator comprising a valve-casing having initial-supply, radiator-inlet, and radiator-outlet chambers and including a looped partition separating said initial-supply and radiator-inlet chambers and formed in opposite walls with two ports connecting the said chambers, and a partition separating said radiator inlet and outlet chambers and formed with a valve-stem guide, together with a by-pass valve controlling one of said ports and having an operating-device extending outside of the casing, an automatic steam-supply valve controlling the other port and having its stem slidingly mounted in said guide, and a thermostat operatively connected with the latter valve for automatically regulating the steam supply in accordance with the demand.

5. In a steam-heating system, the combination of a steam-supply pipe, a radiator, inlet and discharge valves therefor, the former of which closes before the latter, a thermostat located in the line of the radiator discharge and operatively connected with said valves, a by-pass around the inlet-valve from the steam-supply pipe to the radiator, and a valve controlling said by-pass and adjustable at will.

6. A steam-regulator comprising positively-seating inlet and discharge valves adapted to regulate the steam supply to and discharge from a radiator, a spring connection between said valves whereby the discharge-valve is permitted to close after the admission-valve is seated, a thermostat located in the line of the radiator discharge posterior to said discharge-valve and operatively connected with said valves, a by-pass around said inlet-valve for admitting the steam supply directly to the radiator, and a valve controlling said by-pass.

In testimony whereof I have hereunto set my hand in the presence of two subscribing witnesses, the 26th day of October 1907.

JAMES F. McELROY.

Witnesses:
BEULAH CARLE,
ERNEST D. JANSEN.